United States Patent Office 2,987,056
Patented June 6, 1961

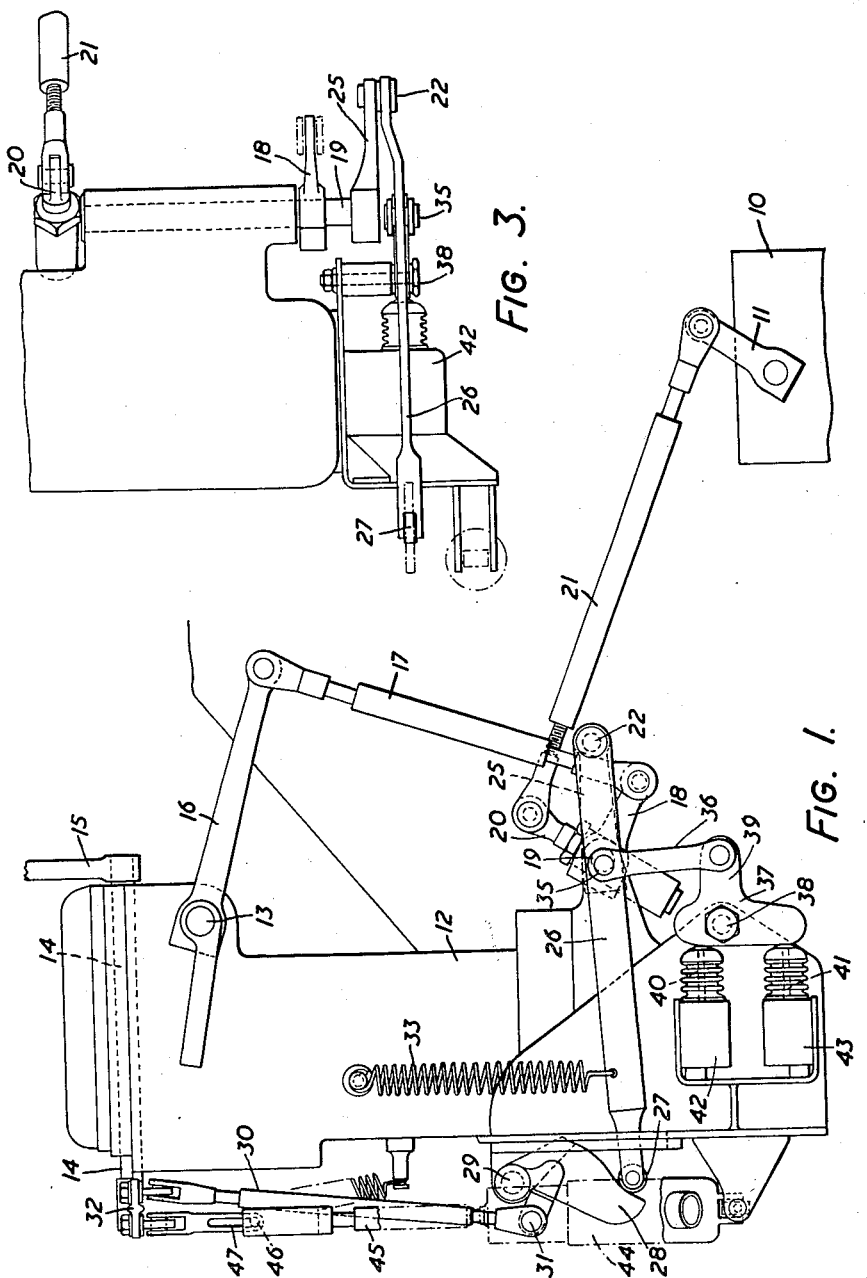

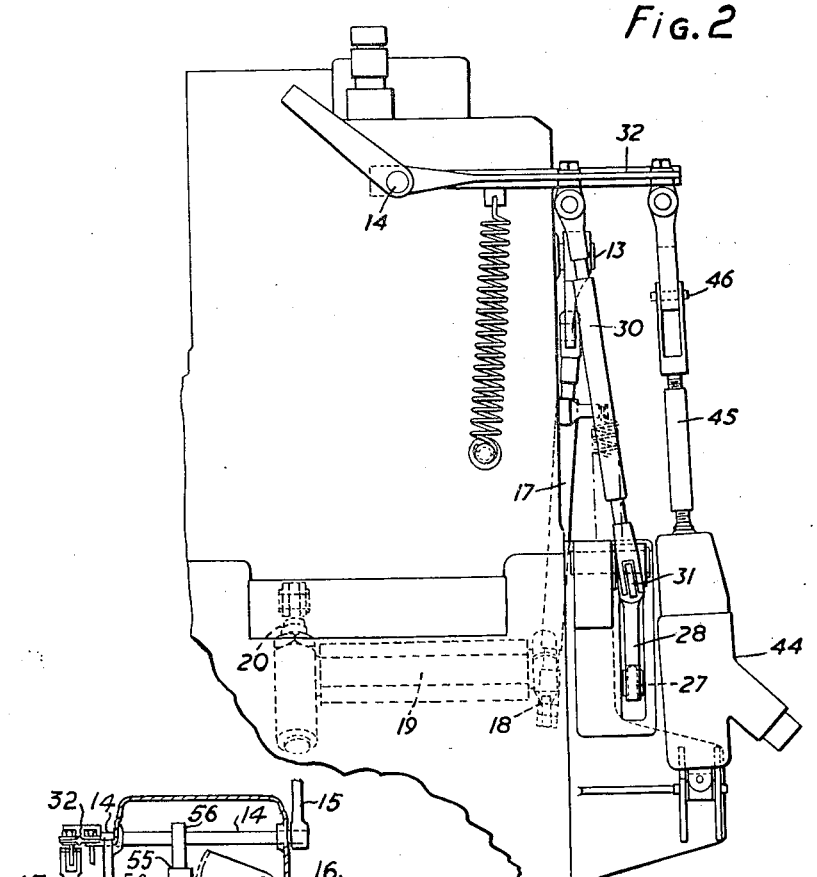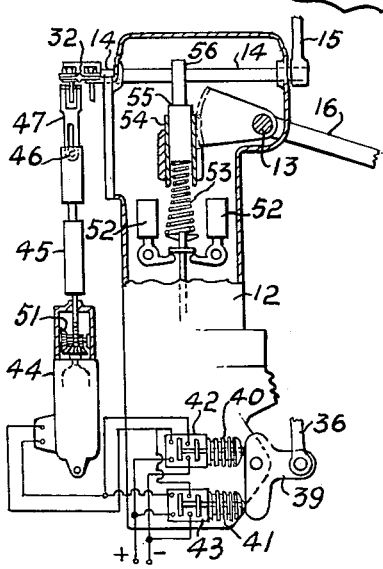

2,987,056
GOVERNOR OPERATED FUEL CONTROL SYSTEMS
Adrian L. Catford and Thomas A. H. Lancashire, London, England, assignors to D. Napier & Son Limited, London, England, a company of Great Britain
Filed Mar. 27, 1959, Ser. No. 802,559
Claims priority, application Great Britain Apr. 3, 1958
5 Claims. (Cl. 123—140)

This invention relates to fuel control systems for fuel injection engines of the type including a governor driven at a speed proportional to engine speed, a governor input or control member arranged to vary the datum speed setting of the governor and a governor output member controlled by the governor and connected to an engine fuel control member adjusting the fuel delivered to the engine per cycle thereof.

It is an object of the invention to provide an automatic torque limiting or fuel limiting device which will prevent excessive fuel being delivered to the engine under various operating conditions. Thus the quantity of fuel which can be injected safely into the engine per cycle will vary with changes in the engine speed and variations in the load applied to the engine.

It has previously been proposed to provide a variable fuel limiting stop which is adjusted in response simply to engine speed and it is an object of the present invention to provide an improved fuel control system which will be relatively simple, robust and efficient.

According to the invention a fuel control system of the type referred to includes a differential device sensitive to movement of both the input and output members of the governor and arranged to act on the input member to reduce the speed selected if the input or output members move beyond a point determined by the instantaneous position of the other member.

The differential device preferably comprises a floating link the opposite ends of which are positioned by members connected to the input and output members of the governor, a point on this link being connected to a servo control device controlling movements of a servo motor which is arranged to move or restrict the movements of the input member of the governor.

The servo control device preferably includes a lost motion connection with the governor input member, which allows a free range of travel of the input member, the upper speed limit of which is controlled by the instantaneous position of the servo motor.

Thus in one arrangement the servo mechanism may comprise a reversing motor controlled by two switches arranged to be actuated in response to movements of the floating link in opposite directions from a central neutral position or range of positions.

According to another preferred feature of the invention the end of the floating link which is positioned by movements of the input member of the governor is connected to a cam device arranged to control the position of this end of the floating link at a predetermined law in relation to the instantaneous position of the governor input member.

The inventioin may be performed in various different ways but one specific embodiment will now be described by way of example with reference to the accompanying drawings in which:

FIGURE 1 is a front elevation of a governor and associated mechanism.

FIGURE 2 is an end elevation thereof in the direction of arrow A in FIGURE 1, and FIGURE 3 is a plan view.

In this example the invention is applied to a governor fuel control system for a fuel injection engine of the diesel type. The engine incorporates fuel injector pumps 10 delivering fuel to the individual cylinders and the volumetric delivery of the pumps per cycle is controlled in normal manner by a "rack" control member 11 operating on the pump plungers which varies the effective stroke of the pumps to control the volume of fuel injected in well known manner.

The control system includes a mechanical governor 12 of the centrifugal type which is driven mechanically at a speed proportional to engine speed. This governor may be of any known kind and will not therefore be described in detail. It incorporates the usual fly weights 52 acting against a compression spring 53 and controlling the axial position of a sleeve 54 which is arranged in turn to control rotational movements of a shaft 13 which constitutes the output member of the governor. The other end of the spring is acted upon by a movable abutment 55 whose position is controlled by a cam 56 on a second rotary shaft 14 which constitutes the input member of the governor. This second shaft is connected to manual operating mechanism 15 which thus enables an operator to select a datum speed setting of the governor.

The output shaft 13 of the governor is connected to a lever 16 arranged to rotate therewith and this lever is connected through a pivoted link 17 to a lever 18, secured to a shaft 19 which is mounted for rotation on a fixed axis, another arm 20 on this shaft 19 being connected by a pivotal link 21 to the rack control member 11.

On the shaft 19 there is also secured a "fuel" lever 25 which is of slightly greater length than either arm 18 or 20 and which is angularly positioned within the angle contained by these two arms, which in the present case is approximately 90°. The remote end of this fuel lever 25 is pivotally connected at 22 to one end (hereinafter referred to as the fuel end) of a floating link 26 which in normal positions of the mechanism extends in a generally horizontal direction and is intersected by the axis of the shaft 19. This floating link has a length of approximately four times the length of the fuel lever 25 and at its opposite end it is provided with a roller 27 engaging a rotary cam 28 mounted to pivot on a fixed axis 29, the angular position of this cam being controlled by an adjustable pivoted link 30, which is connected to the cam at a point 31 offset from the cam axis, the upper end of the link 30 being pivotally connected to a lever 32 mounted on the input shaft 14 of the governor. Thus alterations in the datum speed setting of the governor automatically provide alterations in the angular position of the cam 28 and hence the position of the end of the floating link (hereinafter referred to as the cam end) in contact therewith. The floating link is held in engagement with the cam by a tension spring 33 connected to an intermediate point in its length.

At a point 35 on the floating link 26 which is spaced from the fuel end thereof by a distance approximately equal to the length of the fuel lever 25, there is pivotally connected a short vertical link 36, the other end of which is pivotally attached to a T-shaped member 37 comprising three projecting arms, this member being pivotally mounted on an axis 38 passing through the intersection of these arms. This short vertical link 36 is connected to the horizontal arm 39 of the T and the two remaining arms are arranged to bear against a pair of operating push rods 40, 41 arranged in parallel with one another and spring urged towards the arms of the T-member. These push rods are in turn connected to micro-switches 42, 43 which are arranged in the circuit of a reversing electric motor 44, so as to cause this motor to operate in either direction selectively as one or other of the micro-switches is closed. The electric motor 44 is connected through gearing 51 to a vertical shaft 45 so as to raise or lower this shaft depending upon the direction of rotation of the motor. The shaft 45 is connected through a lost motion device including a pin 46 and slot 47 to the arm 32 connected to rotate with the input shaft 14 of the governor. Thus it will be seen that when one or other of the micro-switches 42, 43 is closed as a result of pivotal movement of the T-member 37, the electric motor 44 will act, to rotate the input shaft 14 of the governor, to reduce or increase the speed setting, and hence to alter the datum setting of the governor and also the angular position of the rotary cam 28 engaging the floating link 26 or alternatively to cause movement in the range of the lost motion slot 47.

In operation of the whole governor system therefore it will be seen that the two ends of the floating link 26 are controlled and positioned by the fuel lever 25 and the rotary cam 28, in response respectively to the instantaneous position of the governor output shaft 13 and hence the fuel pumps themselves, and of the governor input shaft 14. The T-shaped member 37 connected to an intermediate point in the length of the floating link 26 will thus be actuated in dependance upon the instantaneous positions of the governor input and output shafts 14, 13, the exact relationship being dependent upon the geometry and the shape of the rotary cam 28. The arrangement is such that if the operator selects an increased datum speed setting the rotary cam 28 will be moved instantaneously and the output member 13 of the governor will also be moved automatically to increase the rack setting and hence the fuel supply to the engine. These two movements will be imparted to opposite ends of the floating link and may cause one of the micro switches to be closed to actuate the electric motor which will rotate the governor input shaft in a direction to reduce the selected speed setting. This rotation will be imparted automatically to the rotary cam which will alter the position of the floating link and return it to its neutral position when the micro-switch will be again be released. The lost motion connection 46, 47 will then permit lower engine speeds to be selected if required.

The governor system will also operate automatically if at a constant speed setting the load on the engine exceeds a selected value depending upon this instantaneous speed setting. Thus the load on the engine will result in a reduction in speed which will in turn result in movements of the output shaft 13 of the governor in a direction to increase the fuel setting of the rack. These movements will also be imparted to the rack end 22 of the floating link and eventually one of the micro-switches will be closed. The input shaft 14 of the governor will be automatically rotated by the electric motor to reduce the selected speed setting.

It will be appreciated therefore that the system acts in effect as a torque limiting device which is sensitive to the instantaneous positions of both the input and output members of the governor. The torque limiting device therefore is inherently dependent upon the actual speed of the engine, but it will be noted that the system avoids the necessity to provide an additional speed sensitive governor driven mechanically from the engine.

What we claim as our invention and desire to secure by Letters Patent is:

1. A fuel control system for a fuel injection engine including a governor driven at a speed proportional to engine speed, a governor input member arranged to vary the datum setting of the governor, and a governor output member controlled by the governor and connected to an engine control member adjusting the fuel delivered to the engine per cycle, and including a differential device sensitive to movement of both the input and output members of the governor and coupled to drive limit means cooperating with the input member and having a stop which limits movement of the input member in the direction to increase the datum setting, the coupling operating to drive the limit means to move the stop in dependence upon the response of the differential device.

2. A fuel control system as claimed in claim 1 including a servo motor which is arranged to move the stop on said limit means, a control device for the motor, and a floating link the opposite ends of which are positioned by members connected to the input and output members of the governor, a point on this link being connected to the control device.

3. A fuel control system as claimed in claim 2 including a lost motion connection between the floating link and the input member such that when the load on the engine is below the maximum for that speed, the servo motor imposes no restraint on the operator's selection of speed at the input member.

4. A fuel control system as claimed in claim 3 in which the servo motor can turn in either direction and is controlled by two switches connected in circuit with the motor and arranged to be actuated in response to movements of the floating link in opposite directions from a central neutral position or range of positions.

5. A fuel control system as claimed in claim 4 in which the end of the floating link which is positioned by movements of the input member of the governor is connected to a cam device arranged to control the position of this end of the floating link at a predetermined law in relation to the instantaneous position of the governor input member.

References Cited in the file of this patent
UNITED STATES PATENTS

| | | |
|---|---|---|
| 2,602,654 | Parker | July 8, 1952 |
| 2,715,892 | Rodeck et al. | Aug. 23, 1955 |